United States Patent
Sahni et al.

(10) Patent No.: US 11,526,188 B2
(45) Date of Patent: Dec. 13, 2022

(54) SYSTEM AND METHOD FOR SITING OF ENERGY STORAGE SYSTEMS IN AN ELECTRICAL GRID, INCLUDING OPTIMIZING LOCATIONS OF ENERGY STORAGE SYSTEMS BASED ON TECHNICAL PARAMETERS OF AN ENERGY STORAGE SYSTEM OR OTHER PARAMETERS

(71) Applicant: JUPITER POWER, LLC, Austin, TX (US)

(72) Inventors: Mandhir Sahni, Irving, TX (US); Audrey Fogarty, Chicago, IL (US); Andrew Bowman, Austin, TX (US)

(73) Assignee: JUPITER POWER, LLC, Austin, TX (US)

( * ) Notice: Subject to any disclaimer, the term of this patent is extended or adjusted under 35 U.S.C. 154(b) by 0 days.

(21) Appl. No.: 15/929,665

(22) Filed: May 14, 2020

(65) Prior Publication Data

US 2020/0387184 A1  Dec. 10, 2020

Related U.S. Application Data

(60) Provisional application No. 62/848,376, filed on May 15, 2019.

(51) Int. Cl.
| | |
|---|---|
| *G05B 13/04* | (2006.01) |
| *H02J 3/00* | (2006.01) |
| *G05F 1/66* | (2006.01) |
| *G06Q 10/06* | (2012.01) |

(52) U.S. Cl.
CPC ............. *G05F 1/66* (2013.01); *G05B 13/048* (2013.01); *G06Q 10/063* (2013.01); *H02J 3/004* (2020.01)

(58) Field of Classification Search
CPC ...... G05F 1/66; G05B 13/048; G06Q 10/063; H02J 3/004
USPC .......................................................... 700/291
See application file for complete search history.

(56) References Cited

U.S. PATENT DOCUMENTS

| | | | |
|---|---|---|---|
| 2014/0039710 A1* | 2/2014 | Carter .................... | G06Q 10/06 700/291 |
| 2016/0155166 A1* | 6/2016 | He ..................... | G06Q 30/0611 705/80 |
| 2017/0043674 A1* | 2/2017 | DeBoer, III ............ | B60L 53/63 |

OTHER PUBLICATIONS

Ricardo (NPL: Optimal Energy Storage Siting and Sizing: A WECC Case Study, IEEE Transactions on Sustainable Energy, vol. 8, No. 2, Apr. 2017) (Year: 2017).*

(Continued)

*Primary Examiner* — Jigneshkumar C Patel (57) ABSTRACT

Systems and methods for identifying optimal siting locations for an energy storage system. Siting locations are identified based on a value index derived from pricing data associated with a plurality of nodes on an electrical grid. An index is derived for each selected node of the plurality of nodes to produce a siting recommendation.

7 Claims, 4 Drawing Sheets

(56) References Cited

OTHER PUBLICATIONS

Opathella (NPL: Energy Storage Sizing and Siting in Microgrids, 2018 IEEE Electrical Power and Energy Conference (EPEC)) (Year: 2018).*
Pandzic (NPL: Near-Optimal Method for Siting and Sizing of Distributed Storage in a Transmission Network, IEEE Transactions on Power Systems, vol. 30, No. 5, Sep. 2015) (Year: 2015).*
Erdinc (NPL: Comprehensive Optimization Model for Sizing and Siting of DG Units, EV Charging Stations, and Energy Storage Systems, IEEE Transactions on Smart Grid, vol. 9, No. 4, Jul. 2018) (Year: 2018).*
Kolluri (NPL: Siting and Sizing Distributed Storage for Microgrid Applications, SmartGridComm Oct. 23, 26, 2017, Dresden—ISBN 978-1-5386-4055-5) (Year: 2017).*

* cited by examiner

| Node | Period of Assessment | 4-Hr AVI Assessment |
|---|---|---|
| RT_Resource #250_2019 | Q1, 2019 | 229.24 |
| RT_Resource #158_2019 | Q1, 2019 | 176.64 |
| RT_Resource #139_2019 | Q1, 2019 | 170.53 |
| RT_Resource #140_2019 | Q1, 2019 | 170.53 |
| RT_Resource #248_2019 | Q1, 2019 | 163.65 |
| RT_Resource #370_2019 | Q1, 2019 | 146.15 |
| RT_Resource #371_2019 | Q1, 2019 | 122.98 |
| RT_Resource #165_2019 | Q1, 2019 | 81.79 |
| RT_Resource #166_2019 | Q1, 2019 | 81.79 |
| RT_Resource #2_2019 | Q1, 2019 | 63.72 |
| RT_Resource #85_2019 | Q1, 2019 | 62.83 |
| RT_Resource #3_2019 | Q1, 2019 | 62.60 |
| RT_Resource #4_2019 | Q1, 2019 | 62.60 |
| RT_Resource #5_2019 | Q1, 2019 | 62.60 |
| RT_Resource #6_2019 | Q1, 2019 | 62.60 |
| RT_Resource #7_2019 | Q1, 2019 | 62.60 |
| RT_Resource #221_2019 | Q1, 2019 | 59.76 |
| RT_Resource #222_2019 | Q1, 2019 | 59.76 |
| RT_Resource #59_2019 | Q1, 2019 | 59.12 |
| RT_Resource #223_2019 | Q1, 2019 | 59.12 |
| RT_Resource #361_2019 | Q1, 2019 | 59.00 |
| RT_Resource #100_2019 | Q1, 2019 | 58.42 |
| RT_Resource #38_2019 | Q1, 2019 | 56.89 |
| RT_Resource #39_2019 | Q1, 2019 | 56.89 |
| RT_Resource #163_2019 | Q1, 2019 | 54.99 |

FIGURE 3A

| Resource Node #250 | | |
|---|---|---|
| Year | Month | 4-Hr AVI |
| 2019 | 1 | 149.77 |
| 2019 | 2 | 249.68 |
| 2019 | 3 | 288.28 |

FIGURE 3B

| Resource Node #250 - Daily and Intra-Daily Patterns for January 2019 | | | | | | | |
|---|---|---|---|---|---|---|---|
| Year | Month | Day | Charge Cost | Charge Hrs | Discharge Value | Discharge Hours | Daily 4-Hr AVI |
| 2019 | 1 | 1/1/2019 | 14.33 | 1 - 4 | 592.80 | 21 - 24 | 578.47 |
| 2019 | 1 | 1/2/2019 | 73.15 | 13 - 16 | 611.00 | 1 - 4 | 537.84 |
| 2019 | 1 | 1/3/2019 | -78.58 | 10 - 13 | 423.98 | 5 - 8 | 502.56 |
| 2019 | 1 | 1/4/2019 | 0.00 | 10 - 13 | 351.28 | 5 - 8 | 351.28 |
| 2019 | 1 | 1/5/2019 | -1.69 | 21 - 24 | 329.21 | 5 - 8 | 330.90 |
| 2019 | 1 | 1/6/2019 | -3.99 | 14 - 17 | 0.66 | 8 - 11 | 4.65 |
| 2019 | 1 | 1/7/2019 | -0.79 | 1 - 4 | 38.63 | 18 - 21 | 39.42 |
| 2019 | 1 | 1/8/2019 | 0.00 | 13 - 16 | 33.34 | 5 - 8 | 33.34 |
| 2019 | 1 | 1/9/2019 | 10.78 | 9 - 12 | 62.62 | 18 - 21 | 51.84 |
| 2019 | 1 | 1/10/2019 | -16.78 | 10 - 13 | 67.24 | 1 - 4 | 84.03 |
| 2019 | 1 | 1/11/2019 | 3.23 | 14 - 17 | 29.12 | 21 - 24 | 25.89 |
| 2019 | 1 | 1/12/2019 | -0.50 | 10 - 13 | 52.02 | 18 - 21 | 52.52 |
| 2019 | 1 | 1/13/2019 | 0.00 | 13 - 16 | 235.73 | 21 - 24 | 235.73 |
| 2019 | 1 | 1/14/2019 | 21.89 | 14 - 17 | 350.40 | 5 - 8 | 328.51 |
| 2019 | 1 | 1/15/2019 | 1.19 | 14 - 17 | 57.57 | 7 - 10 | 56.37 |
| 2019 | 1 | 1/16/2019 | 0.00 | 10 - 13 | 34.70 | 6 - 9 | 34.70 |
| 2019 | 1 | 1/17/2019 | -3.31 | 13 - 16 | 32.06 | 19 - 22 | 35.38 |
| 2019 | 1 | 1/18/2019 | -3.14 | 14 - 17 | 23.71 | 5 - 8 | 26.85 |
| 2019 | 1 | 1/19/2019 | -29.17 | 10 - 13 | 42.47 | 19 - 22 | 71.64 |
| 2019 | 1 | 1/20/2019 | -0.13 | 12 - 15 | 47.45 | 4 - 7 | 47.58 |
| 2019 | 1 | 1/21/2019 | -7.22 | 15 - 18 | 3.21 | 4 - 7 | 10.42 |
| 2019 | 1 | 1/22/2019 | -24.87 | 11 - 14 | 18.98 | 6 - 9 | 43.85 |
| 2019 | 1 | 1/23/2019 | 0.00 | 11 - 14 | 286.78 | 4 - 7 | 286.78 |
| 2019 | 1 | 1/24/2019 | -21.67 | 13 - 16 | 20.64 | 19 - 22 | 42.31 |
| 2019 | 1 | 1/25/2019 | -0.02 | 13 - 16 | 240.80 | 6 - 9 | 240.81 |
| 2019 | 1 | 1/26/2019 | 0.00 | 11 - 14 | 55.28 | 6 - 9 | 55.28 |
| 2019 | 1 | 1/27/2019 | 0.00 | 10 - 13 | 28.29 | 19 - 22 | 28.29 |
| 2019 | 1 | 1/28/2019 | -23.55 | 11 - 14 | 21.91 | 5 - 8 | 45.46 |
| 2019 | 1 | 1/29/2019 | 3.52 | 11 - 14 | 255.46 | 4 - 7 | 251.94 |
| 2019 | 1 | 1/30/2019 | 0.00 | 11 - 14 | 183.27 | 5 - 8 | 183.27 |
| 2019 | 1 | 1/31/2019 | 0.00 | 13 - 16 | 25.08 | 19 - 22 | 25.08 |

FIGURE 3C

SYSTEM AND METHOD FOR SITING OF ENERGY STORAGE SYSTEMS IN AN ELECTRICAL GRID, INCLUDING OPTIMIZING LOCATIONS OF ENERGY STORAGE SYSTEMS BASED ON TECHNICAL PARAMETERS OF AN ENERGY STORAGE SYSTEM OR OTHER PARAMETERS

CITATION TO PRIOR APPLICATIONS

The present application is a continuation of and claims priority to U.S. Provisional Application No. 62/848,376, titled "SYSTEM AND METHOD FOR SITING OF ENERGY STORAGE SYSTEMS IN AN ELECTRICAL GRID, INCLUDING OPTIMIZING LOCATIONS OF ENERGY STORAGE SYSTEMS BASED ON TECHNICAL PARAMETERS OF AN ENERGY STORAGE SYSTEM OR OTHER PARAMETERS" and filed on or about May 15, 2020.

BACKGROUND OF THE INVENTION

Electrical grids are collections of transmission and distribution power lines interconnecting resources which generate power with loads which consume power. The operation of many electrical grids in the United States is governed by a set of Independent System Operators (ISOs) (e.g., ERCOT, PJM, MISO, NYISO, etc.) or Regional Transmission Organizations (RTOs) that plan or operate a respective associated grid. These ISOs and RTOs (collectively "ISO" herein) are thus responsible for reliably operating and planning the associated electricity grids and the markets thereof, including the determination of price or adjustment of power placed on the grid (or consumed from the grid) and the associated market structure, which may be deregulated. It will be noted here, that while many embodiments as presented herein are given in the context of, and may be applied in, electricity markets which are operated by ISO authorities, other embodiments may be applied in non-ISO regions or markets (e.g., where the management of the electricity grid falls under the jurisdiction of the relevant regulated utility entities or otherwise).

The operation of an electric grid under a (e.g., deregulated) market structure is defined by uncertainty in both the value of, and the magnitude of need for, power at any future time or location. This situation creates a significant information gap for energy storage resources (e.g., batteries or the like) operating in an electrical grid governed by such an electricity market, as these systems can only operate for a limited period of time in a given deployment.

The operating decisions for these systems are governed at least in part by the amount of energy available, or stored, in the energy storage system at any point in time ("state of charge"), the length of time that the system can sustain charging energy from, or discharging energy to, the grid at its maximum power rating ("duration"), and by the total number of times energy may be successfully stored and released prior to expiry of the system capabilities ("cycle-life"). It will be noted here, that a battery is but one example of such an energy storage system and that the use of the term battery herein in any context will be understood to refer more generally to all types of such energy storage systems and that such terms may be thought of as interchangeable for purposes of this disclosure.

In order to decide (1) where to best locate a battery storage facility in an electric grid, and (2) what is the best battery storage size to deploy at a particular location, technical parameters such as storage duration (i.e. the maximum length of time that a battery storage resource can either consume power from or generate power to the grid) should be accounted for in conjunction with the locational assessment of the grid.

Absent a methodology to analyze the combined implications of energy storage location and technical parameters such as energy storage duration within the uncertain operating environment of the electric grid, a battery storage facility may be sited at a location where the facility will be inefficiently used or inadequately sized, thereby limiting the performance of the facility and potentially accelerating diminishment in its overall calendar life.

To illustrate in more detail, all large power system networks and electrical grids are complex non-linear systems that are operated with the objective of balancing the real-time demand and supply in a reliable and economic fashion bearing in mind the constraints associated with the generation, transmission and distribution system network. Most deregulated ISO based electrical grids are also characterized by a centralized generation dispatch and Locational Marginal Pricing (LMP)-centric markets that are intended to optimize the cost of serving the system demand at any given time interval subject to system constraints. LMP is the cost of supplying the next incremental megawatt of load at a specific location, called a "node", on the electrical grid. It may take into account, among other things, bid prices for generation, the flow of power within the transmission system, system operational constraints and power transfer constraints.

A nodal price in an LMP system is the incremental increase in total system cost associated with supplying the next increment of load at a specific location or bus. In a constrained system, the next increment of load at a given bus is typically supplied by adjusting the output of more than one generator or provider of electricity, each contributing to the load in a ratio dictated by the physical attributes of each system and the location of the bus relative to other elements in the system. Typically, the output of some generators must be decreased when the output of other generators is increased, to prevent the flow on constrained lines from exceeding the constraint.

A direct result of this is a highly dynamic and extensive nodal market framework associated with each electrical grid wherein a unique LMP at each node characterizes the cost of serving the next incremental megawatt of electricity demand at that node. It is important to recognize that typical electrical grids across the globe comprise of thousands or even tens of thousands of such nodes, thereby resulting in a like number of such unique price points. For instance, the Texas grid Electric Reliability Council of Texas (ERCOT) comprises approximately 13,000 such pricing nodes.

Accordingly, one of the first key decisions in terms of the development and operation of utility scale battery energy storage assets on such electrical grids is to identify the location on the grid where such battery facilities are to be interconnected. Amongst various existing and rapidly evolving applications of grid-connected battery energy storage facilities, one of the core applications is energy arbitrage, which involves charging the battery (taking energy off the grid) during certain time periods and discharging the battery (putting energy into the grid) at some other time periods. The optimal energy charge-discharge periods associated with the grid-connected battery energy storage facilities can be looked at from two perspectives, namely the grid perspective and the battery facility perspective. The optimal location of the grid connected battery energy storage can vary depending on which of these two perspectives are focused upon.

Existing attempts to address these issues in this general space have mostly focused on assessing optimal sizing (in terms of megawatt capacity and duration) of energy storage facilities at a given location, which is generally determined by extraneous factors such as (a) the availability of an existing connection to the point the grid, or (b) the availability of economic incentives, such as tax credits, for siting at a particular location. There have also been numerous efforts that compare the arbitrage and ancillary service revenues at pre-decided specific locations on the electrical grid. However, as is evident, these efforts assume a prioi a specific location or node on the grid, instead of focusing on identifying an optimal location across thousands of nodes on the grid.

Prior attempts to determine siting of energy storage facilities on the grid, have suffered from a number of issues. These issues stem in large part from the focus of these attempts: they approach the issue from a centralized grid perspective. With regard to the grid perspective and the battery facility perspective mentioned above, the previous attempted solutions for siting the storage facilities are from the centralized grid perspective where the objective is to minimize the sum of the expected operating cost and the investment cost of the energy storage, relative to other more traditional grid solutions that may be available. Moreover, most of these solutions may only be utilized with a limited number of nodes, rendering them essentially useless for applicability to a modern electricity grid which may comprise many thousands of such nodes (e.g., 10,000 nodes or more).

Accordingly, there is a need for energy storage siting systems that allow for energy storage siting solutions that remedy these issues among many others. Specifically, there is a need for energy storage siting systems that provide energy storage siting solutions that can consider a large amount of data related to energy grids comprising multiple thousands of nodes and a range of energy storage operational or technical factors to determine optimal sites for battery storage systems.

SUMMARY OF THE INVENTION

The present disclosure relates generally to electrical power distribution and the electrical grid for such power distribution. More particularly, embodiments of the present disclosure relate to the siting (or selection of location) of energy storage systems connecting to the electrical grid. Even more specifically, embodiments of the present disclosure relate to the identification of optimal locations associated with siting utility scale energy storage facilities across various electricity markets, including nodal-market based electrical grids comprised of thousands (or more) of nodes.

Embodiments as disclosed herein may therefore include energy storage siting systems that focus on identifying optimal utility scale energy storage siting locations from the storage facility operation perspective by considering a range of operational and technical factors associated with the battery and relevant energy data (e.g., including pricing data or the like) associated with each node on an electrical grid. These embodiments present a highly efficient, accurate and flexible approach to screen thousands of nodes across large electrical grids that are characterized by nodal LMP-centric markets to arrive at substantially optimal locations to deploy grid connected energy storage facilities based on the anticipated duration of the battery storage envisaged.

Embodiments may also provide data analytics or parameters (e.g., such as a breakdown by some time interval (monthly, daily, intra-daily, etc.) of the charge/discharge patterns) which may serve as critical inputs into the design of the battery energy storage solution for the specific location. As such, embodiments may also generate technical design parameters of the battery storage systems to be located at determined nodes.

Certain embodiments as disclosed may utilize an aspect of the battery perspective which is to maximize the LMP differential between the charge and discharge periods thereby resulting in highest energy arbitrage periods for the battery energy storage at a given location. These types of embodiments employ an Arbitrage Value Index (AVI), a metric that can be used to optimally site utility scale grid connected battery energy storage facilities in large LMP-centric electrical grids from an energy intensive arbitrage use-case standpoint. Embodiments may utilize the AVI to evaluate the energy arbitrage potential at each distinct node on the electrical grid accounting for certain key battery energy storage parameters and relevant price signals from various nodes across the electrical grid to provide substantially optimal site locations on the grid, along with information on the likely charge/discharge patterns that can be used for detailed design of the battery facility. These embodiments may present an efficient and automated approach to evaluating thousands of distinct electrical nodes on an electrical grid to identify optimal locations from an energy-intensive arbitrage application perspective while simultaneously determining the operational and technical parameters of the battery storage systems that may be deployed at the determined nodes.

Embodiments are thus flexible in that they can evaluate the arbitrage value index across a set of selected nodes for a user-specified battery duration, over a user-specified duration of time and for a user-specified number of charge/discharge cycles per day. Embodiments are also unique in that they present an efficient, flexible and highly automated approach to screen thousands of unique pricing nodes across large electrical grids to identify substantially optimal locations from an energy-intensive battery arbitrage perspective, even in the cases of large electrical grids having multiple thousands of nodes.

Embodiments of an energy storage siting system as disclosed herein may thus provide a number of advantages. Specifically, embodiments may maximize the potential for energy-intensive arbitrage based operation of the battery facilities by identifying optimal sites for the location of energy storage systems, while simultaneously identifying the technical parameters for energy storage systems for those sites, such that the energy storage system to be listed at that location may be designed according to those technical parameters. These embodiments may be highly efficient allowing the evaluation of thousands or tens of thousands of nodes across real-world power system grids for optimal siting of energy storage facilities while utilizing market generated price signals to identify optimal placement of energy storage facilities in terms of grid optimization. Additionally, embodiments may provide supporting information for the subsequent design of the energy storage facility in terms of determined charge/discharge patterns. Moreover, embodiments may provide flexibility in terms of allowing a user to specify the duration of storage and the number of cycles per day for which arbitrage value index needs to be evaluated.

DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 3A-3C are diagrams depicting embodiments of siting data that may be determined by embodiments of an energy storage siting system and presented by a user interface.

DETAILED DESCRIPTION

In the following description of the present invention there are multiple details established to provide a thorough understanding of the invention and the preferred implementations of the invention. It should be clear that the description is not intended to limit the invention to these specific embodiments and those variations, changes, substitutions, or equivalent components will be apparent to those skilled in the art and should not be considered significant differences from the intended scope of the invention.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
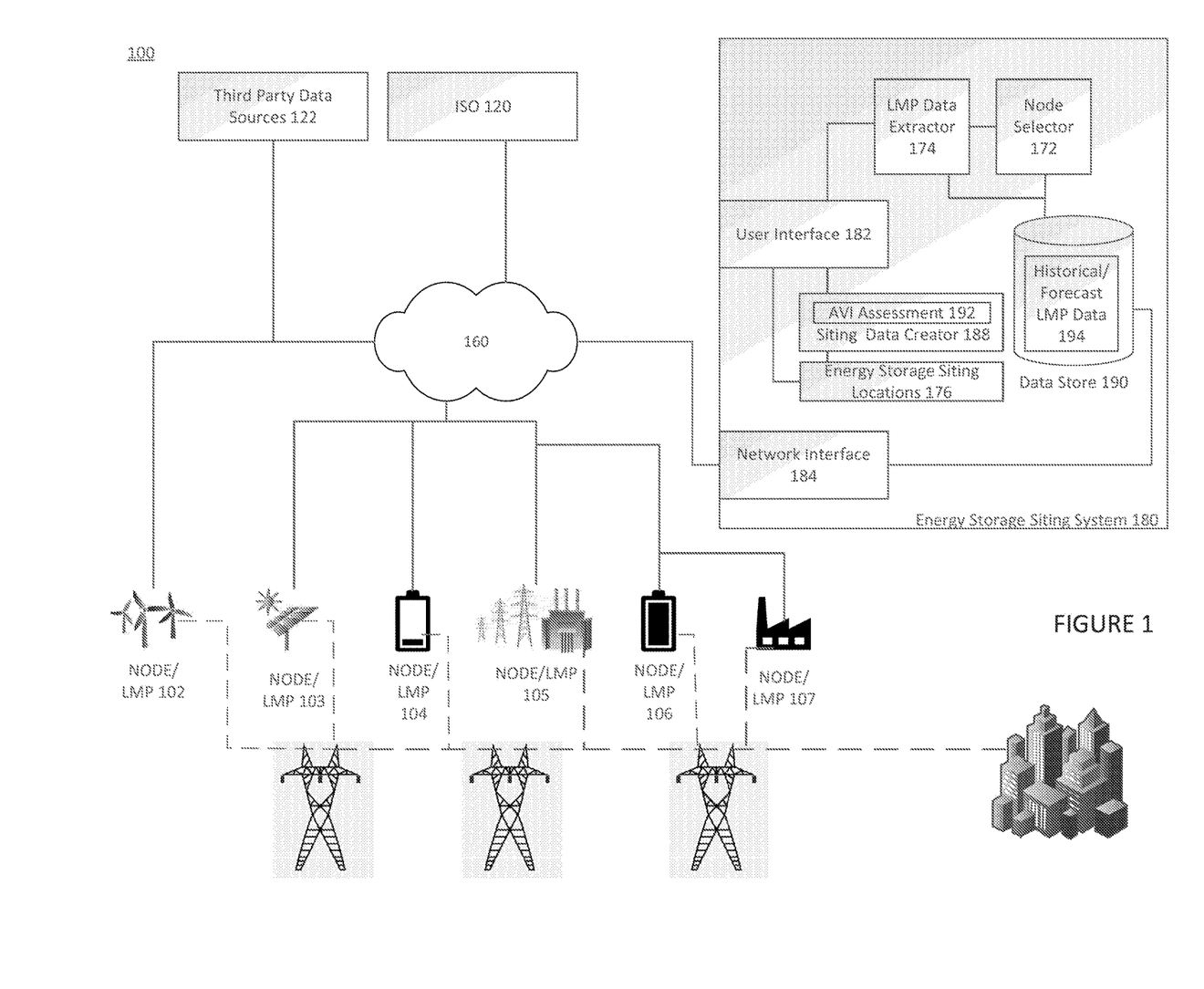
FIG. 1 is a diagram of one embodiment of a topology of an electrical grid including an embodiment of an energy storage siting system.

Embodiments of an energy storage siting system in accordance with the present disclosure may be deployed in various topologies for an electrical grid. Turning to FIG. 1 then, a block diagram of one embodiment as deployed in an exemplary topology is depicted. Here, electrical grid 100 is an interconnected network of electrical resources for delivering electricity from producers to consumers.

The electrical grid 100 may thus include geographically or electrically distributed nodes 102, 103, 104, 105, 106, 107 which may, include, for example, producers (e.g., generators) of electricity to provide electricity into the electrical grid 100 or consumers (e.g., loads) of electricity from the grid 100. As discussed, each node 102, 103, 104, 105, 106, 107 may have an associated LMP price at a given point in time. These nodes 102, 103, 104, 105, 106, 107 on the electrical grid 100 may include potential energy storage systems 104, 106. An energy storage system 104, 106 may be capable of both producing energy to provide into the grid and consuming energy to store such energy for later provisioning into the grid 100. The energy stored by an energy storage system 104, 106 may be consumed from the electrical grid 100 itself or from another source coupled to the energy storage system 104, 106 (which may, or may not, be coupled directly to the electrical grid 100), such as solar panels, wind turbines, thermal generators or the like.

A battery energy storage (BES) system is one example of such an energy storage system 104, 106. Other examples of energy storage systems (e.g., that are not batteries or BESs) are possible and are fully contemplated herein, as mentioned previously. Thus the terms battery energy storage and battery system are used herein interchangeably with the term energy storage system without loss of generality. Regardless of underlying battery chemistry, each battery energy storage (BES) system will incorporate the same basic design and may be housed in, for example, custom-build standalone warehouses or multiple standard shipping-size containers.

These batteries 104, 106 may function differently from other energy resources 102, 103, 105, 107. For example, batteries 104, 106 may only be utilized for a limited amount of time during a given time period and operate as both producers and consumers on the electrical grid. Moreover, batteries 104, 106 may be depleted, and even exhausted, given power demands, or may cycle over long periods of time either alternating between charging and discharging, or charging or discharging at very low levels relative to the maximum charging and discharging rates. Additionally, batteries 104, 106 may be heavily subject to environmental or operational conditions. For example, the hotter or colder the environment, the less efficiently a battery may operate.

The fact that batteries may operate as both producers (e.g., generators) and consumers (e.g., loads) on the electrical grid means such batteries 104, 106 may be utilized for a number of purposes. One of these purposes is for arbitrage of electrical power. Specifically, the markets that govern the price of power on the electrical grid 100 may be LMP-centric markets. In these types of markets, an entity utilizes the parameters associated with the electrical grid 100 such as demand, supply, supply offer and demand bid curves, network constraints, operational constraints capacity etc. to determine market clearing prices for every node 102, 103, 104, 105, 106, 107 on the electrical grid 100 while reliably serving the system load across each interval. This entity is the ISO 120 that is responsible for operating, planning and pricing the electricity market for the electrical grid 100. The determined prices may be the cost of serving an incremental MW of power from that node 102, 103, 104, 105, 106, 107. The determination of these prices may occur at each of a set of relatively closely spaced time intervals (e.g., 5 minutes) such that a new LMP price is determined for each node 102, 103, 104, 105, 106, 107 on the grid for each of those time periods. Accordingly, as the electrical grid 100 may be highly volatile and encounter both foreseen and unforeseen changes, the prices across the nodes may be highly volatile over the course of some period (e.g., a day).

By taking advantage of the dual capabilities of batteries 104, 106 this volatility provides an opportunity to perform energy arbitrage. Thus, a battery 104, 106 may be charged by purchasing electricity at a first cost to charge the battery 104, 106 at a certain time and may provide energy to the electrical grid 100 at a second time such that operators of the battery 104, 106 get paid for that electricity at a second cost. The spread or difference between the charging cost and the discharging price is one of the factors to be taken into account when deciding on utilizing the batteries 104, 106 for energy arbitrage.

However, not all nodes 102, 103, 104, 105, 106, 107 within the electrical grid 100 will support the use of batteries 104, 106 in this manner. As discussed, these nodes 102, 103, 104, 105, 106, 107 may be geographically and electrically diverse and are affected by different conditions and are subject to different pricing dynamics. As such, the spread between prices at certain nodes 102, 103, 104, 105, 106, 107 may not be enough to support the installation of batteries at those nodes from an energy arbitrage perspective (e.g., the cost of development and installation of a battery 104, 106 may be greater than the revenues that may be made through use of the battery 104, 106 in that installation). Especially in instances where the technical or operational aspects of battery 104, 106 are ill-suited to the conditions. Conversely, certain nodes 102, 103, 104, 105, 106, 107 on the electrical grid may be well suited to that use of batteries, even more so when the technical and operational parameters of such batteries 104, 106 are appropriately tailored to that use at that node.

Accordingly, determining an appropriate or substantially optimal location, or locations, of batteries on electrical grid 100 can be a complicated and error prone process in part because of the complexity of the electrical grid and associated pricing markets and the number of options available for operation and design of batteries. To facilitate the creation of siting recommendations, an energy storage siting system 180 may be utilized.

In one embodiment, the energy storage siting system 180 may be coupled to the ISO 120 or one or more third party data sources 122 using an electronic communication network 160 such as the Internet, an internet, an intranet, a wireless or wireline network of some combination of computer networks. The energy storage siting system may include a user interface 182, a computer network interface 184 and a siting data generator 188.

Historical or forecast data (collectively historical data herein) may be obtained (e.g., through computer network interface 184) by the energy storage siting system 180 and stored in a local data store 190. This historical or forecast data 194 may, for example, be obtained directly from ISO 120 (e.g., using an ISO LMP interface or the like provided by the ISO 120), may be obtained from one or more third party data source 122 that may collect and organize such LMP pricing data from the ISO 120, or may be obtained from some combination of ISO 120 and one or more third party data sources 122.

This historical or forecast data 194 may include historical ISO data including historical market prices for a particular time period at each node (or a subset of nodes) on the electrical grid 100. In other words, the historical or forecast data 194 may include the LMP prices determined for each time interval (e.g., 5 minutes, 15 minutes or hourly) over a time period (e.g., a quarter, a year, etc.). For example, the historical or forecast data 194 may be the historical price at each node on the electrical grid 100 for each interval (e.g., 5 minute) for each day for an entire year. The historical or forecast data 194 may also be forecast pricing for each node for each interval over some time period.

The user interface 182 may offer a user the ability to interact with the siting data creator 188 to obtain a list of nodes (e.g., energy storage siting locations 176) on the electrical grid 100 ranked according to their suitability for installation of a battery for the use in energy arbitrage and to obtain associated data, including technical and operational parameters of the battery that should be installed at that node 102, 103, 104, 105, 106, 107 to achieve desired results.

In one embodiment a user may interact with the user interface 182 to provide a set of criteria to be utilized by node selector 172 in the determination of historical data for a set of nodes 102, 103, 104, 105, 106, 107. Specifically, a user may wish to confine the set of nodes 102, 103, 104, 105, 106, 107 that will be evaluated and ranked by the energy storage siting system 180. The nodes may be confined, for example, based on geography or other criteria. The node selector 172 may utilize the criteria provided by the user through the user interface 182 to determine a set of nodes 102, 103, 104, 105, 106, 107 on the electrical grid 100 meeting the provided criteria from historical or forecast data 194 (e.g., which may be all, none or some subset of nodes 102, 103, 104, 105, 106, 107 of the electrical grid 100). Once the set of nodes to be ranked is determined by the node selector 172, the LMP data extractor 174 may determine the historical or forecast data 194 associated with the determined set of nodes. As discussed above, historical or forecast data 194 may comprise historical and/or forecast pricing data associated with the determined set of nodes. The siting data creator 188 may use this historical data for the set of nodes to rank the determined set of nodes and return the ranked list of nodes 176 to the user through the user interface 182.

In particular, in one embodiment a user may specify a set of parameters for use in the determination of the ranked list 176 through the user interface 182, such as operational or technical parameters for a battery such as those regarding a desired lifecycle for a battery, the charge time for a battery, the discharge time or rate for a battery or other, how often per time period (e.g., per day) it is desired to charge or discharge the battery, whether the user desires to operate the battery consecutively (e.g., to charge all at once and discharge all at once) or non-consecutively (where charging and discharging may be spaced in time or interleaved), or other parameters.

Siting data creator 188 may receive this user configuration and utilize AVI module 192 based on these user configurations and historical or forecast data 194 (e.g., as determined by LMP data extractor 174). Using this AVI module 192, a list of the set of nodes on the electrical grid 100 (e.g., as determined by node selector 172) ranked according to their suitability for installation of a battery for use in energy arbitrage may be determined, along with associated data including technical and operational parameters of the battery to be installed at such a node. The ranked list of results 176 and associated data may be returned to the user through the user interface 182.

AVI module 192 may utilize an algorithm that is designed to determine AVI and thereby identify optimal siting locations for utility scale energy storage facilities on large LMP-centric electrical grids from an energy intensive arbitrage perspective considering a range of technical and operational parameters of an energy storage system. In one embodiment, this AVI algorithm may be formulated as:

$AVI_n$ for an D-hr energy storage facility at node n=$(P_{max\text{-}avg\text{-}n} - P_{min\text{-}avg\text{-}n})$ where $$P_{max\text{-}avg\text{-}n} = (P_{max(1)\text{-}n} + P_{max(2)\text{-}n} + \ldots + P_{max(D)\text{-}n})/D$$

$$P_{min\text{-}avg\text{-}n} = (P_{min(1)\text{-}n} + P_{min(2)\text{-}n} + \ldots + P_{min(D)\text{-}n})/D$$

$$P_{max(i)\text{-}n} = \text{Max}(\{P_{0\text{-}n}, P_{1\text{-}n}, P_{2\text{-}n}, \ldots P_{T\text{-}n}\}, i)$$

$$P_{max(j)\text{-}n} = \text{Max}(\{P_{0\text{-}n}, P_{1\text{-}n}, P_{2\text{-}n}, \ldots P_{T\text{-}n}\}, j)$$

Such that if CF=1 then $P_{max(1)}, P_{max(2)} \ldots P_{max(D)}$ have to be consecutive hour prices and $P_{min(1)}, P_{min(2)} \ldots P_{min(D)}$ also have to be consecutive hour prices.

D—duration of energy storage (hours)

T—time period of evaluation for 1 charge/discharge cycle (hours)

$P_{max\text{-}avg\text{-}n}$ maximum rolling average of node price across D hours over duration of T at node n $P_{min\text{-}avg\text{-}n}$ minimum rolling average of node price across D hours over duration of T at node n $P_{max(i)\text{-}n}$—ith maximum price at node n (where i=1 implies highest price, i=2 implies second highest price etc.) These are prices at which energy would be sold.

$P_{min(j)\text{-}n}$—jth minimum price at node n (where j=1 implies lowest price, j=2 implies second lowest price etc.) These are prices at which energy would be bought.

$P_{x\text{-}n}$—price for interval x at node n

CF—consecutive hour flag (on or off)

n—node

Within this embodiment of an AVI algorithm, there can be no instance where the same $P_{x\text{-}n}$ is utilized for both the $P_{max(i)\text{-}n}$ and $P_{min(i)\text{-}n}$ functions as called by the $P_{max\text{-}avg\text{-}n}$ and $P_{min\text{-}avg\text{-}n}$ functions, respectively. This is because each $P_{x\text{-}n}$ corresponds to a specific hour, and the energy storage system can only perform either a charge or discharge activity during that hour thereby corresponding to only either a buy ($P_{min(i)\text{-}n}$) or sell ($P_{max(i)\text{-}n}$) price.

AVI module 192 can then determine the AVI, as outlined above, for the duration of the price data made available for each node and identifies the node or nodes exhibiting the highest AVI across the time-period associated with the historical or forecast data 194. In certain embodiments, the AVI compare the relative arbitrage potential based on the duration of the energy storage under consideration. Note, for example, that the AVI for a 2-hr energy storage could be different in comparison to the AVI for a 4-hr energy storage at the same node.

Alternatively or additionally, nodes exhibiting a high 4-Hr arbitrage potential (or AVI) may differ from those exhibiting high 2-Hr arbitrage potential. It may also be noted that by changing the time-period T of evaluation for 1 charge/discharge cycle, AVI can gauge the arbitrage potential available at a given node (e.g., albeit with a slightly different usage pattern). For instance, if T is set at 24 hours and D at 4 hours, then the resulting AVI provides the 4-hr arbitrage potential assuming 1 charge/discharge cycle per day (i.e., 24 hours). Alternatively or additionally, if T is set at 48 hours and D at 4 hours, then the resulting AVI provides the 4-hr arbitrage potential assuming 1 charge/discharge cycle per every 2 days (i.e., 48 hours).

Note that the AVI module 192 may utilize an iterative algorithm to ensure no overlap between the hours exhibiting most optimal charge and most optimal discharge potential bearing in mind that an energy storage facility 102 cannot charge and discharge at the same time. So the D-hr AVI determined for each window may be subject to this constraint.

Figure 2:
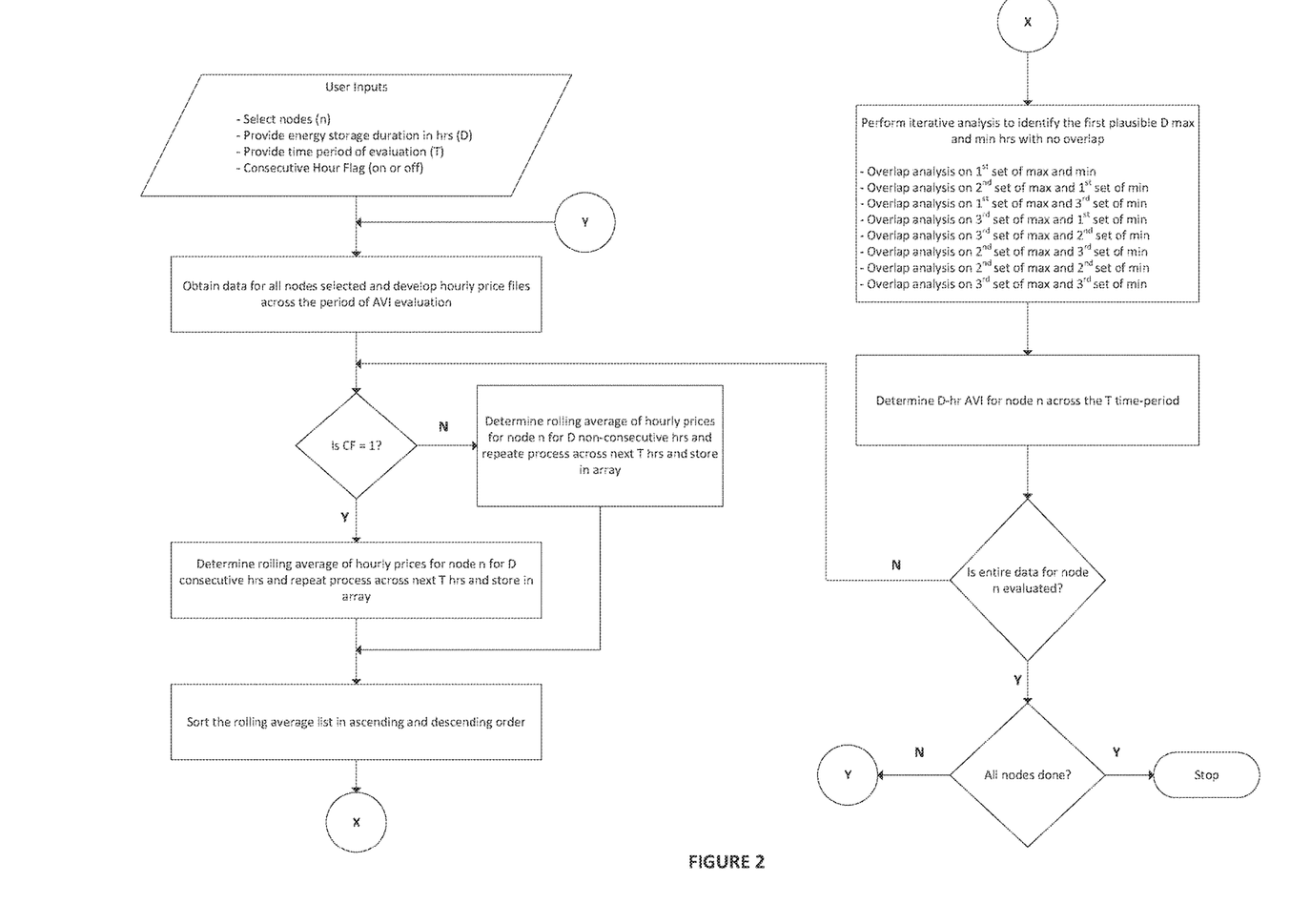
FIG. 2 is a diagram of one embodiment of a method for determining siting locations.

Moving to FIG. 2, a flow diagram for one embodiment of a method determining a ranked list of nodes and associated battery parameters using an AVI is depicted. The output from embodiments of this method may include:

D-hr AVI for each node investigated across the entire data made available to algorithm Monthly breakdowns of the D-hr AVI (if applicable) to understand seasonal patterns of energy intensive arbitrage usage Daily and intra-daily charge and discharge patterns including daily D-Hr AVI for each node under investigation Analysis of system wide AVI for two successive periods of time can also provide a unique way to assess the increase in volatility in the electricity markets from an energy storage perspective.

Figure 3A:
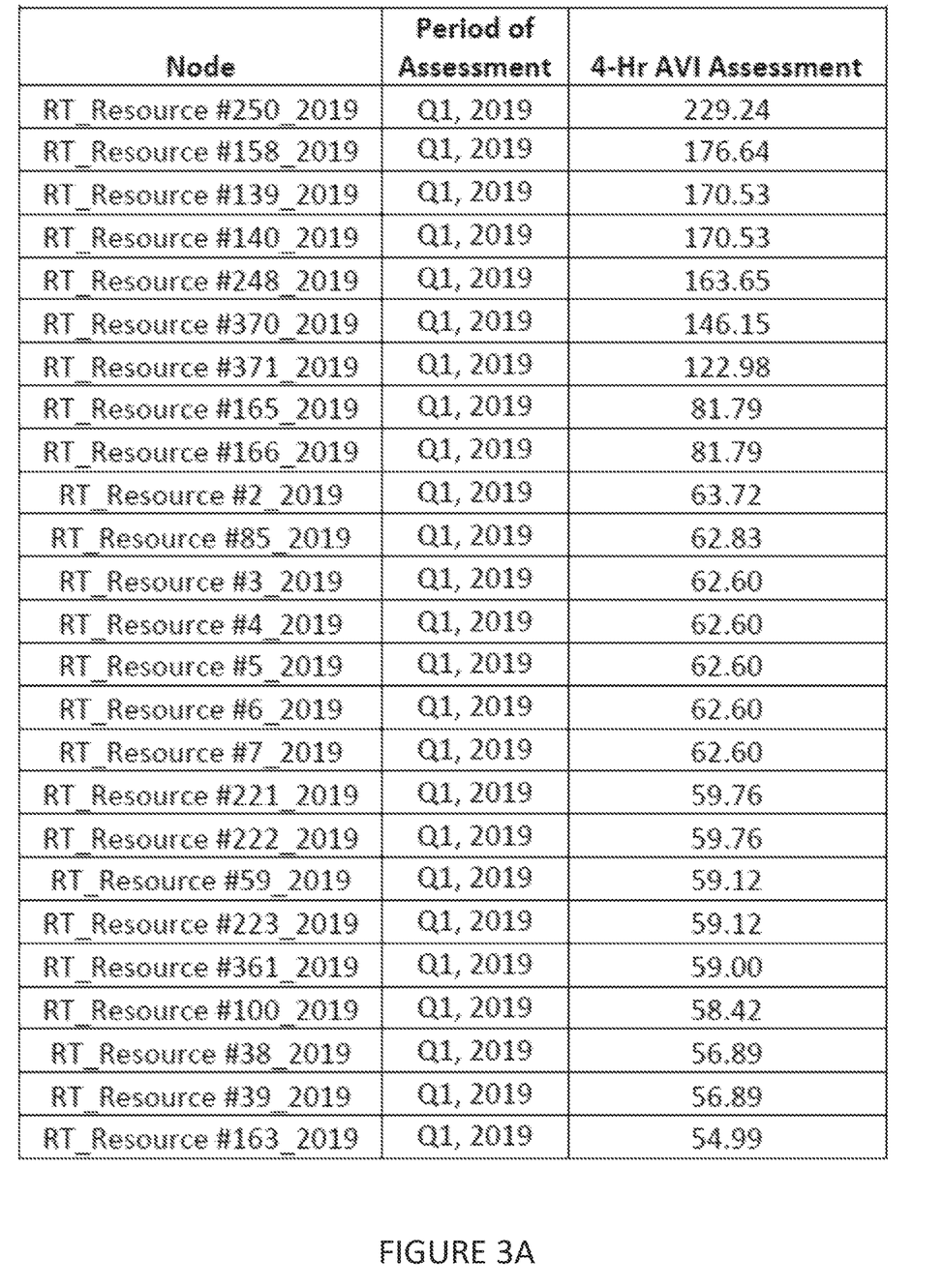

It may now be useful to look at examples of data that may be generated by a siting data creator 188 and accessed through a user interface 182 of the energy storage siting system 180. FIGS. 3A-3C depict examples of just such siting results and data. Here, FIG. 3A depicts an ordered (ranked) list nodes along with associated siting data. The top ranked (e.g., first listed) resource node with the highest 4-Hr AVI across the period of data evaluation presents the optimal location for energy storage siting from an energy arbitrage standpoint.

For this example, the input parameters (e.g., as set by a user through the user interface 182) have been set as follows: energy storage duration D=4 hours; time period of evaluation for 1 charge/discharge cycle (hours)=24 hours; CF—consecutive hour flag ON (e.g., discharge hours must occur consecutively, and charge hours must occur consecutively).

In this case, the AVI assessment has been performed for generation resource nodes ("Nodes") comprising the Texas grid for Quarter 1, 2019 (indicated under "Period of Assessment" column) along with the 4-Hr AVI assessment for that node, where the 4-Hr AVI assessment may be an average 4-Hr assessment as determined from a 4-Hr AVI assessment determined for that node for each time period (here day or 24 hours) during the period of assessment (here quarter 1). Each node has a corresponding particular geographic location.

Thus, a user may interact with the user interface to select a particular node on the list to obtain more data regarding that particular node. FIG. 3B depicts siting data for a selected node (here node #250). In this example, the interface presents the breakdown of a particular quarter by month for the node along with the 4-Hr AVI average for each month of that quarter (e.g., from a 4-Hr AVI assessment determined for that node for each time period (here day or 24 hours) during the month).

A user may interact with the user interface to select a particular month on the list of months for the node to obtain more data regarding that particular node. FIG. 3C depicts siting data for the selected node (again node #250), including, for example, monthly, daily and intra-daily patterns of usage to achieve the determined AVI. Looking at the first row of FIG. 3C, for Jan. 1, 2019 the cost for charging at resource node #250 during the hours 1-4 (e.g., 1:00 am-4:00 am) would be $14.33) while the amount paid to operators of an energy storage system at node #250 would be $592.80 if the energy storage system was discharged during the hours 21-24 (e.g., 9:00 pm-12:00 am). Accordingly, the daily 4-hr AVI for Jan. 1, 2019 at node #250 would be $578.47.

Any restrictive language used in conjunction with any embodiments as disclosed herein such as "must," "requires," "needed," or the like should be taken as applying only to those specific embodiments and not to embodiments as disclosed generally.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard drive (HD)), hardware circuitry or the like, or any combination.

Embodiments of a hardware architecture for implementing certain embodiments are described herein. One embodiment can include one or more computers communicatively coupled to a network.

At least portions of the functionalities or processes described herein can be implemented in suitable computer-executable instructions. The computer-executable instructions may be stored as software code components or modules on one or more computer readable media (such as non-volatile memories, volatile memories, direct access storage drive (DASD) arrays, magnetic tapes, floppy diskettes, hard drives, optical storage devices, etc. or any other appropriate computer-readable medium or storage device). In one embodiment, the computer-executable instructions may include lines of compiled C++, Java, hypertext markup language (HTML), or any other programming or scripting code.

Additionally, the functions of the disclosed embodiments may be shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A system for managing energy dispatch comprising:
an energy storage siting platform comprising:
a local memory configured to store node data representing a plurality of nodes, wherein a node represents a specific location within an energy grid, said local memory being further configured to receive pricing data relating to said plurality of nodes from an external pricing data source;
a user interface configured to allow a user to choose one or more node selection criteria;
a node selection module configured to generate a subset of nodes from said plurality of nodes based on said one or more node selection criteria; and
a node evaluation module configured to evaluate potential energy sales and energy purchases to generate an arbitrage value index for each node of said subset of nodes based on at least said pricing data, wherein said arbitrage value index for an evaluated node comprises the difference between a maximum average price of energy at said evaluated node over an interval of time given a specified energy storage duration and a minimum average price of energy at said evaluated node over said interval of time given said specified energy storage duration, wherein said node evaluation module is further configured to report said arbitrage value index for each node of said subset of nodes to the user via the user interface.

2. The system of claim 1 wherein said one or more node selection criteria comprises battery charge time and battery discharge time.

3. The system of claim 1 wherein said pricing data comprises historical pricing and usage data.

4. The system of claim 3 wherein said external pricing source comprises an independent system operator.

5. A method for managing energy dispatch comprising:
choosing one or more node selection criteria on an energy storage siting platform;
assembling a subset of nodes from a plurality of nodes based on said one or more node selection criteria, wherein a node of said plurality of nodes represents a specific location within an energy grid, wherein said energy storage siting platform is configured to receive pricing data and is operably coupled to a local memory configured to store node data representing said plurality of nodes, wherein said local memory is further configured to store said pricing data;
retrieving said pricing data associated to each node in said subset of nodes;
performing an analysis of said subset of nodes, wherein said analysis comprises evaluating an arbitrage value index for said each node, wherein said arbitrage value index for an evaluated node comprises the difference between a maximum average price of energy at said evaluated node over an interval of time given a specified energy storage duration and a minimum average price of energy at said evaluated node over said interval of time given said specified energy storage duration, wherein said evaluating includes consideration of potential energy sales and energy purchases based on at least said pricing data; and
generating a siting recommendation based on at least said arbitrage value index.

6. The method of claim 5 wherein said one or more node selection criteria comprises battery charge time and battery discharge time.

7. The method of claim 5 wherein said pricing data comprises historical pricing and usage data.

* * * * *